United States Patent
Ren et al.

(10) Patent No.: US 11,932,578 B1
(45) Date of Patent: Mar. 19, 2024

(54) GRANITE STONE POWDER PHOSPHORIC ACID-BASED GEOPOLYMER AND PREPARATION METHOD THEREOF

(71) Applicant: Wuhan University of Technology, Hubei (CN)

(72) Inventors: Liuyi Ren, Hubei (CN); Lu Zhang, Hubei (CN); Shenxu Bao, Hubei (CN); Yimin Zhang, Hubei (CN); Zhiming Qiu, Hubei (CN); Yuxiao Zhou, Hubei (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 18/504,109

(22) Filed: Nov. 7, 2023

(30) Foreign Application Priority Data

Nov. 8, 2022 (CN) .......................... 202211391952.1

(51) Int. Cl.
  *C04B 22/16* (2006.01)
  *C04B 14/04* (2006.01)
  *C04B 14/10* (2006.01)
  *C04B 28/02* (2006.01)
  *C04B 40/00* (2006.01)
  *C04B 103/10* (2006.01)

(52) U.S. Cl.
  CPC .......... *C04B 22/165* (2013.01); *C04B 14/048* (2013.01); *C04B 14/106* (2013.01); *C04B 28/021* (2013.01); *C04B 40/0082* (2013.01); *C04B 2103/10* (2013.01)

(58) Field of Classification Search
  CPC ... C04B 22/165; C04B 14/048; C04B 14/106; C04B 28/021; C04B 40/0082; C04B 2103/10
  See application file for complete search history.

(56) References Cited

U.S. PATENT DOCUMENTS

| | | | |
|---|---|---|---|
| 9,957,197 B1 * | 5/2018 | Kim | ...................... C04B 28/006 |
| 2017/0362123 A1 | 12/2017 | Yammine et al. | |
| 2018/0244572 A1 | 8/2018 | Ranjbar | |
| 2020/0039884 A1 * | 2/2020 | Dubey | .................... C04B 28/14 |

FOREIGN PATENT DOCUMENTS

| | | | | |
|---|---|---|---|---|
| CN | 104556876 A | * | 4/2015 | |
| CN | 107540336 A | * | 1/2018 | |
| CN | 108409176 A | * | 8/2018 | .......... C04B 12/005 |
| CN | 109553315 A | | 4/2019 | |

(Continued)

OTHER PUBLICATIONS

English machine translation of CN-114262179-A (Year: 2022).*

(Continued)

*Primary Examiner* — Jennifer A Smith
*Assistant Examiner* — Jeffrey Eugene Barzach
(74) *Attorney, Agent, or Firm* — Pilloff Passino & Cosenza LLP; Sean A. Passino; Rachel K. Pilloff

(57) ABSTRACT

A granite stone powder phosphoric acid-based geopolymer and a preparation method thereof are provided. The granite stone powder phosphoric acid-based geopolymer is prepared from following raw materials in parts by weight: 35-70 parts of granite stone powder, 15-50 parts of metakaolin, 8-50 parts of fly ash, 8-30 parts of acid activation solution and 8-30 parts of solvent.

7 Claims, 1 Drawing Sheet

(56) References Cited

FOREIGN PATENT DOCUMENTS

| CN | 112573868 A | * | 3/2021 | ........... C04B 28/006 |
|----|-------------|---|--------|--------------------------|
| CN | 112573868 A |   | 3/2021 | |
| CN | 113773001 A | * | 12/2021 | |
| CN | 113880506 A | * | 1/2022 | |
| CN | 114262179 A | * | 4/2022 | |
| CN | 114560640 A | * | 5/2022 | |
| CN | 114560640 A |   | 5/2022 | |
| EP | 3459918 A1 | * | 3/2019 | |
| JP | 2020152611 A | * | 9/2020 | |

OTHER PUBLICATIONS

English machine translation of CN-113773001-A (Year: 2021).*
English machine translation of CN-108409176-A (Year: 2018).*
English machine translation of CN-113880506-A (Year: 2022).*
English machine translation of CN-112573868-A (Year: 2021).*
English machine translation of CN-114560640-A (Year: 2022).*
English machine translation of CN-104556876-A (Year: 2015).*
English machine translation of JP-2020152611-A (Year: 2020).*
English machine translation of CN-107540336-A (Year: 2018).*
First Office Action for China Application No. 202211391952.1, dated Jun. 8, 2023.
Notification to Grant Patent for China Application No. 202211391952.1, dated Aug. 28, 2023.
First Search Report for China Application No. 202211391952.1.
Supplementary Search Report for China Application No. 202211391952.1.

* cited by examiner

| uniformly mixing the granite stone powder, the metakaolin and the fly ash to obtain a mixture | — S1 |

↓

| uniformly mixing the mixture, acid activation solution and solvent, and molding and curing to obtain the cured granite stone powder phosphoric acid-based geopolymer | — S2 |

GRANITE STONE POWDER PHOSPHORIC ACID-BASED GEOPOLYMER AND PREPARATION METHOD THEREOF

CROSS-REFERENCE TO RELATED APPLICATIONS

This application claims priority of Chinese Patent Application No. 202211391952.1, filed on Nov. 8, 2022, the entire contents of which are incorporated herein by reference.

TECHNICAL FIELD

The disclosure relates to the technical field of phosphoric acid-based geopolymers, and in particular to a granite stone powder phosphoric acid-based geopolymer and a preparation method thereof.

BACKGROUND

Geopolymer is an inorganic polymer with a three-dimensional network structure composed of tetrahedral units of [$AlO_4$] and [$SiO_4$]. It has excellent mechanical properties, acid and alkali resistance, fire resistance and high temperature resistance. As a new type of green cementitious material, it has gradually become one of the directions of solid waste resource utilization. In recent years, geopolymer raw materials have gradually expanded from traditional metakaolin to industrial solid wastes such as red mud, fly ash and slag, but there is little research on the technology of acid-activated granite stone powder. Acid-activated cementitious materials have lower dielectric loss than alkaline geopolymers, and have stronger cohesiveness, so they have higher compressive strength, lower weathering rate and higher thermal stability, and may show the characteristics of fast hardening and early strength, acid and alkali resistance, corrosion resistance, good sealing, high temperature resistance and freeze-thaw resistance (Yu Chunsong, Zhang Lingling, Zheng Dawei, Yang Feihua, Wang Qingguo, Wu Wentong, Wang Chenxi, Cang Daqiang. Research and application progress of solid waste-based geopolymers [J]. China Science: Technology Science, 2022, 52(04):529-546).

Granite stone powder (hereinafter referred to as stone powder) is the waste produced in the processes of sawing and polishing granite, and its main components are consistent with the main body of granite, all of which are minerals such as quartz and feldspar. If properly used, the granite stone powder may also show the characteristics of granite with low weathering resistance, corrosion resistance, wear resistance and low water absorption. The reuse of granite stone powder provides a direction for stone processing industry to improve economic benefits, solve environmental pollution problems and realize green development (Gan Jingqi, Liu Yan, Dai Fengyuan, Lu Tiancai, Sun Shengyao, Zhang Haiyang, Lu Zongsheng. Research progress of granite stone powder reuse [J]. Journal of Liaoning University of Science and Technology, 2021, 23 (05): 1-3+20).

At present, there are few reports on the preparation of phosphoric acid-based geopolymer from granite stone powder as raw materials. Although granite stone powder contains a lot of Si (silicon) and a certain amount of Al (aluminium), due to the high content of Si in it, a lot of Si in the geopolymer does not participate in the reaction of geopolymer, and the excess Si causes pores and cracks in the prepared geopolymer, so the compressive strength of the specimen is poor, which greatly affects the sustainable utilization of granite stone powder.

Fly ash is a good precursor of alkali-activated geopolymer, and its intrinsic glass may be used as the source of polymer activity under strong alkaline conditions. Different from alkali activation, the inactive floating beads in acid-activated fly ash keep a good spherical structure, and the content of active components is less, so it is difficult to depolymerize. Metakaolin has excellent alkali-activated reactivity, but under acidic conditions, due to the limitation of metakaolin's lamellar structure, it is difficult for adjacent Si—OH to undergo dehydration polycondensation, which is not conducive to the generation of gel phase, thus affecting the compressive strength of geopolymer. Due to the limitation of the above raw materials under acidic conditions, the compressive strength of phosphoric acid-based geopolymers made from the above single raw material is extremely poor.

SUMMARY

The objective of the present disclosure is to overcome the above technical deficiencies, provide a granite stone powder phosphoric acid-based geopolymer and a preparation method thereof, and solve the technical problem of poor compressive strength of phosphoric acid-based geopolymer made of granite stone powder in the prior art.

One aspect of the disclosure provides a granite stone powder phosphoric acid-based geopolymer. The granite stone powder phosphoric acid-based geopolymer is prepared from following raw materials in parts by weight: 35-70 parts of granite stone powder, 15-50 parts of metakaolin, 8-50 parts of fly ash, 8-30 parts of acid activation solution and 8-30 parts of solvent.

The other aspect of the disclosure provides a method for preparing a granite stone powder phosphoric acid-based geopolymer, including following steps:

S1, uniformly mixing granite stone powder, metakaolin and fly ash to obtain a mixture; and S2, uniformly mixing the mixture, acid activation solution and solvent, and molding and curing to obtain a cured granite stone powder phosphoric acid-based geopolymer.

Compared with the prior art, the invention has following beneficial effects.

In the disclosure, the granite stone powder, metakaolin and fly ash are utilized synergistically, so that solid waste raw materials are complementary to each other to obtain better treatment effect and geopolymer performance; at the same time, taking a variety of solid wastes as the precursor raw materials of geopolymer reduces the production cost and realize the resource utilization of large quantities of solid wastes; in addition, the disclosure also solves the problems that granite stone powder may only be used as a small amount of admixture in the existing utilization mode, such as large application limitation, high utilization cost, complex technological process, large consumption of natural resources and the like.

Compared with the prior art, the disclosure also has following beneficial effects.

Firstly, compared with other raw materials currently used, such as steel slag, clay, red mud, etc., the disclosure takes granite stone powder as the main raw material for preparing phosphoric acid-based geopolymers, which broadens the raw materials for preparing geopolymers and provides a new direction for the comprehensive utilization of granite stone powder which is less studied and difficult to utilize.

Secondly, in the disclosure, only the acid activation solution is used as the activator, and other chemical agents are not needed as the activator, so that the preparation process is simplified, the problem of "frosting" caused by the alkali activation solution is effectively avoided, and the raw material cost is reduced.

Thirdly, in the disclosure, phosphoric acid and sulfuric acid are mixed in a certain proportion as acid activation solution, where phosphoric acid provides phosphate ions to participate in the formation of aluminum-oxygen tetrahedron, and sulfuric acid is more conducive to providing $H^+$ on the premise of not changing the molar ratio of $H_3PO_4$ (phosphoric acid)/$Al_2O_3$, so that the $H^+$ in the system increases, the aluminum and silicon dissolved from the powder increase, and the geopolymer gel in the product also increases.

Fourthly, in the preparation process of the disclosure, when the granite stone powder and the fly ash are stirred and dissolved, heat is released, so that the temperature inside the specimen is increased, which is beneficial to the hydration reaction and promotes the hardening of the slurry, so that the early strength of the phosphoric acid-based geopolymer specimen is greatly improved.

Fifthly, according to the disclosure, demolding is carried out after curing at room temperature for a certain period of time, and the maximum 28-day compressive strength of the geopolymer reaches 36.97 MPa, reaching the C35 strength grade specified in GB/T50081-2002 Standard for Test Methods of Mechanical Properties of Ordinary Concrete. The prepared specimens have high early strength, which is beneficial to the application in traffic and road emergency repair, building materials preparation and so on.

Lastly, the disclosure has the characteristics of simple process, low cost, low energy consumption, high utilization rate of granite stone powder and environmental friendliness; the prepared phosphoric acid-based geopolymer has high compressive strength and good impermeability, and the phosphoric acid-based geopolymer has good curing effect on heavy metal ions.

The specific embodiments of the present disclosure described above do not limit the scope of protection of the present disclosure. Any other corresponding changes and deformations made according to the technical concept of the present disclosure should be included in the protection scope of the claims of the present disclosure.

BRIEF DESCRIPTION OF THE DRAWING

The FIGURE is a flow chart of a method for preparing a granite stone powder phosphoric acid-based geopolymer.

DETAILED DESCRIPTION OF THE EMBODIMENTS

In order to make the objective, technical scheme and advantages of the present disclosure clearer, the present disclosure is further described in detail with examples. It should be understood that the specific embodiments described here are only used to explain the disclosure, and are not used to limit the disclosure.

One aspect of the disclosure provides a granite stone powder phosphoric acid-based geopolymer. The granite stone powder phosphoric acid-based geopolymer is prepared from following raw materials in parts by weight: 35-70 parts of granite stone powder, 15-50 parts of metakaolin, 8-50 parts of fly ash, 8-30 parts of acid activation solution and 8-30 parts of solvent.

In the disclosure, the particle size D50 of granite stone powder is 20-30 μm, and the main chemical components of the granite stone powder are: $SiO_2$ (silicon dioxide) 50-70%, $Al_2O_3$ (aluminium oxide) 10-20%, $Fe_2O_3$ (iron oxide) 0.5-3% and CaO (calcium oxide) 0-3% by mass percentage.

In the disclosure, the particle size D50 of metakaolin is 5-20 μm, and the main chemical components of the metakaolin are: $SiO_2$ 35-60%, $Al_2O_3$ 30-50%, MgO (magnesium oxide) 0.1-1%, CaO 0-2% and $Fe_2O_3$ 0-3% by mass percentage.

In the disclosure, the fly ash is F-type fly ash, and the main chemical components of the fly ash are: $SiO_2$ 30-55%, $Al_2O_3$ 20-30%, $Fe_2O_3$ 3-6%, CaO 3-6% and $SO_3$ (sulfur trioxide) 0.5-3% by mass percentage.

In the disclosure, the mass ratio of the metakaolin to the fly ash is 1:(0.4-2), preferably 1:(0.45-1.5), more preferably 1:(0.45-1.2), and even more preferably 1:(0.9-1.1). Within this mass ratio range, the obtained granite stone powder phosphoric acid-based geopolymer has higher compressive strength.

In the present disclosure, the solvent is water.

In the disclosure, the mass ratio of the total amount of granite stone powder, metakaolin and fly ash to the solvent is 1:(0.2-0.3), preferably 1:0.25. Within this mass ratio range, the obtained granite stone powder phosphoric acid-based geopolymer has higher compressive strength.

In the disclosure, the acid activation solution is a mixed solution of sulfuric acid and phosphoric acid. In the disclosure, phosphoric acid and sulfuric acid are evenly mixed, and the introduction of sulfuric acid makes the concentration of $H^+$ in the system increase, the $H^+$ in the system increases, the aluminum and silicon dissolved from the powder increase, the geopolymer gel in the product increases, and the compressive strength also increases.

In some preferred embodiments of the present disclosure, the concentration of sulfuric acid is 16-19M (mole per liter), further 18.4M; the concentration of phosphoric acid is 12-18M, further 14.7M; the mass ratio of sulfuric acid to phosphoric acid is 1:(19-26), more preferably 1:24. Within this mass ratio range, the obtained granite stone powder phosphoric acid-based geopolymer has higher compressive strength.

In the disclosure, the mass ratio of the total amount of granite stone powder, metakaolin and fly ash to the acid activation solution is 1:(0.2-0.3), preferably 1:0.25. Within this mass ratio range, the obtained granite stone powder phosphoric acid-based geopolymer has higher compressive strength.

In some preferred embodiments of the present disclosure, the above-mentioned granite stone powder phosphoric acid-based geopolymer is prepared from the following raw materials in parts by weight: 35-60 parts of granite stone powder, 25-35 parts of metakaolin, 10-35 parts of fly ash, 22-25 parts of acid activation solution and 22-25 parts of solvent.

In some more preferred embodiments of the present disclosure, the above-mentioned granite stone powder phosphoric acid-based geopolymer is prepared from the following raw materials in parts by weight: 35 parts of granite stone powder, 32 parts of metakaolin, 33 parts of fly ash, 25 parts of acid activation solution and 25 parts of water.

The other aspect of the disclosure provides a method for preparing a granite stone powder phosphoric acid-based geopolymer, as shown in the FIGURE, which includes the following steps:

S1, uniformly mixing granite stone powder, metakaolin and fly ash to obtain a mixture; and S2, uniformly mixing the mixture, acid activation solution and solvent, and molding and curing to obtain the cured granite stone powder phosphoric acid-based geopolymer.

In the disclosure, a molding mode is vibration molding.

In the disclosure, a curing temperature is 60-80° C., and curing time is 18-36 h.

In the disclosure, in order to avoid redundancy, some raw materials are summarized as follows.

The particle size D50 of granite stone powder is 24.06 μm, and the main chemical components of the granite stone powder are: $SiO_2$ 70.0%, $Al_2O_3$ 16.3%, $Fe_2O_3$ 1.7% and CaO 1.3% by mass percentage;

the particle size D50 of metakaolin is 10.3 μm, and the main chemical components of metakaolin are: $SiO_2$ 55.5%, $Al_2O_3$ 40.1%, MgO 0.2%, CaO 0.1% and $Fe_2O_3$ 0.76% by mass percentage;

the fly ash is F-type fly ash, and the main chemical components of fly ash are: $SiO_2$ 50.4%, $Al_2O_3$ 27.5%, $Fe_2O_3$ 4.8%, CaO 3.5% and $SO_3$ 0.7% by mass percentage.

Embodiment 1

S1, putting granite stone powder, metakaolin and fly ash in a drying oven, drying until the mass does not change, and cooling to room temperature to obtain dried granite stone powder, metakaolin and fly ash;

S2, fully mixing and stirring 35 parts of granite stone powder, 32 parts of metakaolin and 33 parts of fly ash for 20 min to obtain a solid mixture;

S3, adding 25 parts of acid activation solution (including 24 parts of phosphoric acid with a concentration of 14.7M and 1 part of sulfuric acid with a concentration of 18.4M) and 25 parts of water, and stirring for 5 min to obtain granite stone powder phosphoric acid-based geopolymer slurry; and S4: pouring the slurry into a 20 mm*20 mm*20 mm mold for vibration molding, and curing in a drying oven at 60° C. for 1 day to obtain the cured cementitious material.

The 28-day compressive strength of geopolymer cementitious materials obtained by this method is 36.97 MPa (mega pascal).

Embodiment 2

S1, putting granite stone powder, metakaolin and fly ash in a drying oven, drying until the mass does not change, and cooling to room temperature to obtain dried granite stone powder, metakaolin and fly ash;

S2, fully mixing and stirring 60 parts of granite stone powder, 27 parts of metakaolin and 13 parts of fly ash for 20 min to obtain a solid mixture;

S3, adding 25 parts of acid activation solution (including 24 parts of phosphoric acid with a concentration of 14.7M and 1 part of sulfuric acid with a concentration of 18.4M) and 25 parts of water, and stirring for 5 min to obtain granite stone powder phosphoric acid-based geopolymer slurry; and S4: pouring the slurry into a 20 mm*20 mm*20 mm mold for vibration molding, and curing in a drying oven at 60° C. for 1 day to obtain the cured cementitious material.

The 28-day compressive strength of geopolymer cementitious materials obtained by this method is 32.02 MPa.

Embodiment 3

S1, putting granite stone powder, metakaolin and fly ash in a drying oven, drying until the mass does not change, and cooling to room temperature to obtain dried granite stone powder, metakaolin and fly ash;

S2, fully mixing and stirring 50 parts of granite stone powder, 34 parts of metakaolin and 16 parts of fly ash for 20 min to obtain a solid mixture;

S3, adding 25 parts of acid activation solution (including 24 parts of phosphoric acid with a concentration of 14.7M and 1 part of sulfuric acid with a concentration of 18.4M) and 25 parts of water, and stirring for 5 min to obtain granite stone powder phosphoric acid-based geopolymer slurry; and S4: pouring the slurry into a 20 mm*20 mm*20 mm mold for vibration molding, and curing in a drying oven at 60° C. for 1 day to obtain the cured cementitious material.

The 28-day compressive strength of geopolymer cementitious materials obtained by this method is 28.86 MPa.

Embodiment 4

S1, putting granite stone powder, metakaolin and fly ash in a drying oven, drying until the mass does not change, and cooling to room temperature to obtain dried granite stone powder, metakaolin and fly ash;

S2, fully mixing and stirring 35 parts of granite stone powder, 16 parts of metakaolin and 49 parts of fly ash for 20 min to obtain a solid mixture;

S3, adding 25 parts of acid activation solution (including 24 parts of phosphoric acid with a concentration of 14.7M and 1 part of sulfuric acid with a concentration of 18.4M) and 25 parts of water, and stirring for 5 min to obtain granite stone powder phosphoric acid-based geopolymer slurry; and S4: pouring the slurry into a 20 mm*20 mm*20 mm mold for vibration molding, and curing in a drying oven at 60° C. for 1 day to obtain the cured cementitious material.

The 28-day compressive strength of geopolymer cementitious materials obtained by this method is 13.54 MPa.

Embodiment 5

S1, putting granite stone powder, metakaolin and fly ash in a drying oven, drying until the mass does not change, and cooling to room temperature to obtain dried granite stone powder, metakaolin and fly ash;

S2, fully mixing and stirring 35 parts of granite stone powder, 49 parts of metakaolin and 16 parts of fly ash for 20 min to obtain a solid mixture;

S3, adding 25 parts of acid activation solution (including 24 parts of phosphoric acid with a concentration of 14.7M and 1 part of sulfuric acid with a concentration of 18.4M) and 25 parts of water, and stirring for 5 min to obtain granite stone powder phosphoric acid-based geopolymer slurry; and S4: pouring the slurry into a 20 mm*20 mm*20 mm mold for vibration molding, and curing in a drying oven at 60° C. for 1 day to obtain the cured cementitious material.

The 28-day compressive strength of geopolymer cementitious materials obtained by this method is 19.86 MPa.

Comparative Embodiment 1

35 parts of granite stone powder, 32 parts of metakaolin and 33 parts of fly ash in S2 of embodiment 1 are replaced with 50 parts of metakaolin and 50 parts of fly ash, and the other steps are the same as in the embodiment 1.

The 28-day compressive strength of the cementitious material obtained in comparative embodiment 1 is 17.61 MPa, which is about 20 MPa lower than that in embodiment 1. The reason is that the solubility of S1 in metakaolin and fly ash under acidic conditions is much less than that under alkaline conditions, while the solubility of Al in acidic solution increases with the decrease of pH, and the generated geopolymer S1/Al will decrease, and $SiO_2$ exists in the form of $Si(OH)_4$ monomer when dissolved. When the concentration of $Si(OH)_4$ is small, it may exist stably for a long time, which makes the reaction efficiency of polymerization decrease, thus leading to the decrease of the compressive strength of geopolymer.

Comparative Embodiment 2

35 parts of granite stone powder, 32 parts of metakaolin and 33 parts of fly ash in the S2 of embodiment 1 are replaced with 50 parts of granite stone powder and 50 parts of fly ash, and the other steps are the same as in the embodiment 1.

The 28-day compressive strength of the cementitious material obtained in Comparative embodiment 2 is 8.36 MPa, which is about 30 MPa lower than that in embodiment 1. The reason is that the acid activation activity of fly ash is insufficient, and the spherical structure of floating beads in fly ash fails to adapt to the internal stress of gel shrinkage at high temperature when the fly ash is cured at high temperature. After a long period of high temperature curing, with the loss of water and the shrinkage of gel, the contact surface between floating beads and gel breaks, which eventually reduces the compressive strength.

Comparative Embodiment 3

35 parts of granite stone powder, 32 parts of metakaolin and 33 parts of fly ash in S2 of embodiment 1 are replaced with 50 parts of granite stone powder and 50 parts of metakaolin, and the other steps are the same as in embodiment 1.

The 28-day compressive strength of the cementitious material obtained in comparative embodiment 3 is 15.82 MPa. Compared with embodiment 1, compressive strength decreases by about 20 MPa. The reason is that when fly ash is not added, the active Al in flaky metakaolin fails to completely contact with the acid activation solution, and is used as the filler of the network structure in the form of unreacted particles, so the degree of geopolymerization reaction is not high, which leads to less compressive strength. Fly ash contains inactive spherical floating beads, which are not easy to agglomerate and disperse a large number of flaky metakaolin. Such dispersion may strengthen the dehydration condensation reaction between Al—OH and Si—OH in acid-activated geopolymerization reaction, thus enhancing the participation degree of metakaolin in geopolymerization reaction, increasing the number of Si—O—Al bonds in geopolymer gel, further optimizing the structure of geopolymer network, and further brings about excellent mechanical strength.

Comparative Embodiment 4

The acid activation solution in the S3 of embodiment 1 is replaced by 25 parts of phosphoric acid with a concentration of 14.7M, and the other steps are the same as in embodiment 1.

The 28-day compressive strength of the cementitious material obtained in comparative embodiment 4 is 16.17 MPa, which is about 20 MPa lower than that in embodiment 1. The reason is that compared with phosphoric acid, the same number of parts by mass of sulfuric acid may be hydrolyzed to produce more $H^+$. After sulfuric acid is replaced by phosphoric acid, the concentration of $H^+$ in geopolymer slurry decreases, and the $H^+$ participating in the formation of low molecular polymer in polycondensation process decreases, resulting in less gel phase, thus reducing the compressive strength of geopolymer.

Comparative Embodiment 5

The acid activation solution in the S3 of embodiment 1 is replaced by 11 parts of sulfuric acid with a concentration of 18.4M and 24 parts of phosphoric acid with a concentration of 14.7M. In other words, 10 parts of sulfuric acid with a concentration of 18.4M are added on the basis of embodiment 1, and the other steps are the same as embodiment 1.

The 28-day compressive strength of the cementitious material obtained in comparative embodiment 5 is 7.54 MPa, which is about 30 MPa lower than that in embodiment 1. The reason is that there are obvious local defects on the surface of the specimen. Sulfuric acid is a strong acid with active chemical properties. The increase of sulfuric acid dosage increases the reaction speed, thus generating reaction heat. The reaction heat is easy to accumulate locally, resulting in local defects and cracks. Therefore, the compressive strength of the produced geopolymer decreases.

Comparative Embodiment 6

The acid activation solution in the S3 of embodiment 1 is replaced by 1 part of sulfuric acid with a concentration of 18.4M and 34 parts of phosphoric acid with a concentration of 14.7M. In other words, 10 parts of phosphoric acid with a concentration of 14.7M are added on the basis of embodiment 1, and the other steps are the same as embodiment 1.

The 28-day compressive strength of the cementitious material obtained in comparative embodiment 6 is 12.44 MPa, which is about 25 MPa lower than that in embodiment 1. The reason is that with the increase of phosphoric acid, there are excessive $PO_4^{3-}$ and $HPO_4^{2-}$ in geopolymer slurry. Part of $A^{3+}$ balances the charges of phosphate radical and hydrogen phosphate radical to form aluminum phosphate precipitate, and the number of aluminum-oxygen tetrahedrons participating in the polycondensation reaction to form geopolymer gel decreases, and the compressive strength of generated geopolymer decreases.

What is claimed is:
1. A granite stone powder phosphoric acid-based geopolymer, wherein the granite stone powder phosphoric acid-based geopolymer is prepared from following raw materials in parts by weight: 35-70 parts of granite stone powder, 15-50 parts of metakaolin, 8-50 parts of fly ash, 8-30 parts of acid activation solution and 8-30 parts of solvent; wherein
   a particle size D50 of the granite stone powder is 20-30 μm;
   the fly ash is F-type fly ash, the main chemical components of the fly ash are: $SiO_2$ 30-55%, $Al_2O_3$ 20-30%, $Fe_2O_3$ 3-6%, CaO 3-6% and $SO_3$ 0.5-3% by mass percentage;
   a mass ratio of the metakaolin to the fly ash is 1:(0.4-2);

the acid activation solution is a mixed solution of sulfuric acid and phosphoric acid; a concentration of the sulfuric acid is 16-19M; a concentration of the phosphoric acid is 12-18M;

a mass ratio of the sulfuric acid to the phosphoric acid is 1:(19-26); and the solvent is water.

2. The granite stone powder phosphoric acid-based geopolymer according to claim 1, wherein a mass ratio of a total amount of the granite stone powder, the metakaolin and the fly ash to the solvent is 1:(0.2-0.3).

3. The granite stone powder phosphoric acid-based geopolymer according to claim 1, wherein a mass ratio of a total amount of the granite stone powder, the metakaolin and the fly ash to the acid activation solution is 1:(0.2-0.3).

4. The granite stone powder phosphoric acid-based geopolymer according to claim 1, wherein the granite stone powder phosphoric acid-based geopolymer is prepared from the following raw materials in parts by weight: 35-60 parts of granite stone powder, 25-35 parts of metakaolin, 10-35 parts of fly ash, 22-25 parts of acid activation solution and 22-25 parts of solvent.

5. The granite stone powder phosphoric acid-based geopolymer according to claim 1, wherein the main chemical components of the granite stone powder are: $SiO_2$ 50-70%, $Al_2O_3$ 10-20%, $Fe_2O_3$ 0.5-3% and CaO 0-3% by mass percentage; and the main chemical components of the metakaolin are: $SiO_2$ 35-60%, $Al_2O_3$ 30-50%, MgO 0.1-1%, CaO 0-2% and $Fe_2O_3$ 0-3% by mass percentage.

6. A method for preparing the granite stone powder phosphoric acid-based geopolymer according to claim 1, comprising the following steps:

uniformly mixing the granite stone powder, the metakaolin and the fly ash to obtain a mixture; and uniformly mixing the mixture, the acid activation solution and the solvent, and molding and curing to obtain a cured granite stone powder phosphoric acid-based geopolymer.

7. The method for preparing the granite stone powder phosphoric acid-based geopolymer according to claim 6, wherein a curing temperature is 60-80° C., and curing time is 18-36 h.

* * * * *